US008813044B2

(12) United States Patent
Bantz et al.

(10) Patent No.: US 8,813,044 B2
(45) Date of Patent: *Aug. 19, 2014

(54) DYNAMIC OPTIMIZATION OF MOBILE SERVICES

(75) Inventors: David F. Bantz, Portland, ME (US); Steven J. Mastrianni, Unionville, CT (US); James R. Moulic, Poughkeepsie, NY (US); Dennis G. Shea, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,686

(22) Filed: Sep. 6, 2012

(65) Prior Publication Data
US 2012/0329443 A1 Dec. 27, 2012

Related U.S. Application Data

(63) Continuation of application No. 12/465,875, filed on May 14, 2009.

(51) Int. Cl.
*G06F 9/45* (2006.01)
*G06F 9/44* (2006.01)

(52) U.S. Cl.
USPC ........... 717/136; 717/120; 717/121; 717/137; 717/138; 717/139; 717/140; 717/141; 717/142; 717/143; 717/144; 717/145; 717/146; 717/147; 717/148; 717/149; 717/150; 717/151; 717/152; 717/153; 717/154; 717/155; 717/156; 717/157; 717/158; 717/159; 717/160; 717/161; 717/168; 717/169; 717/106; 717/107; 717/108

(58) Field of Classification Search
None
See application file for complete search history.

(56) References Cited

U.S. PATENT DOCUMENTS 6,260,190 B1 * 7/2001 Ju .................................. 717/156
6,473,748 B1 * 10/2002 Archer ........................... 706/45

(Continued)

FOREIGN PATENT DOCUMENTS

JP 2005173893 A 6/2005

OTHER PUBLICATIONS

"Link-Time Binary Rewriting Techniques for Program Compaction" by Bjorn De Sutter, Bruno De Bus, and Koen De Bosschere, Ghent University, ACM Transactions on Programming Languages and Systems, vol. 27, No. 5, Sep. 2005, pp. 882-945.*

(Continued)

*Primary Examiner* — Henry Tsai
*Assistant Examiner* — Jing-Yih Shyu
(74) *Attorney, Agent, or Firm* — Scully Scott Murphy & Presser PC; Anne V. Dougherty, Esq.

(57) ABSTRACT

A method, system, and article of manufacture are disclosed for transforming a definition of a process for delivering a service. This service process definition is comprised of computer readable code. The method comprises the steps of expressing a given set of assumptions in a computer readable code; and transforming said process definition by using a processing unit to apply said assumptions to said process definition to change the configuration of the process definition. The process definition may be transformed by using factors relating to the specific context in or for which the process definition is executed. Also, the process definition may be transformed by identifying, in a flow diagram for the service process definition, flows to which the assumptions apply, and applying program rewriting techniques to those identified flows.

10 Claims, 8 Drawing Sheets

FLOW CHART FOR PROCESS TRANSFORMATION

(56) References Cited

U.S. PATENT DOCUMENTS

| | | | |
|---|---|---|---|
| 6,983,457 B2 * | 1/2006 | Mitsumori et al. | 717/145 |
| 7,020,869 B2 * | 3/2006 | Abrari et al. | 717/108 |
| 7,114,146 B2 * | 9/2006 | Zhang et al. | 717/106 |
| 7,346,888 B1 * | 3/2008 | Srinivasan et al. | 717/105 |
| 7,404,188 B2 * | 7/2008 | Luty et al. | 719/315 |
| 7,444,314 B2 * | 10/2008 | Rouvellou et al. | 706/47 |
| 7,650,590 B2 * | 1/2010 | Bender | 717/106 |
| 7,757,221 B2 * | 7/2010 | Zheng et al. | 717/136 |
| 7,873,952 B2 * | 1/2011 | Shtilman et al. | 717/154 |
| 8,015,554 B2 * | 9/2011 | Varma | 717/137 |
| 8,131,663 B1 * | 3/2012 | Taylor | 706/59 |
| 8,156,481 B1 * | 4/2012 | Koh et al. | 717/151 |
| 2003/0233367 A1 | 12/2003 | Uluakar et al. | |
| 2005/0086102 A1 | 4/2005 | Harrison et al. | |
| 2006/0031498 A1 * | 2/2006 | Kinugawa et al. | 709/225 |
| 2007/0073567 A1 * | 3/2007 | Challapalli | 705/8 |
| 2007/0088598 A1 | 4/2007 | Challapalli et al. | |
| 2007/0169039 A1 * | 7/2007 | Lin | 717/146 |
| 2007/0174490 A1 * | 7/2007 | Choi et al. | 709/246 |
| 2007/0226730 A1 * | 9/2007 | Coyle et al. | 717/170 |
| 2008/0119226 A1 | 5/2008 | Son | |
| 2009/0216786 A1 * | 8/2009 | Akiyama et al. | 707/100 |

OTHER PUBLICATIONS

De Sutter, B., et al., "Link-Time Binary Rewriting Techniques for Program Compaction", ACM Transactions on Programming Languages and Systems (TOPLAS), Sep. 2005, vol. 27, Issue 5.

Cao, et al., "An Interactive Service Customization Model"—pp. 1-25.

Amendment Under 37 C.F.R. 1.111 dated Oct. 10, 2013 filed in related U.S. Patent Application, namely U.S. Appl. No. 12/465,875.

* cited by examiner

MAJOR SOFTWARE COMPONENTS

BASELINE APPLICATION SOFTWARE UPDATE PROCESS

EXPEDITED APPLICATION SOFTWARE UPDATE PROCESS

DATA FLOW OF THE APPLICATION SOFTWARE UPDATE PROCESS

FLOW CHART FOR PROCESS TRANSFORMATION

DYNAMIC OPTIMIZATION OF MOBILE SERVICES

CROSS REFERENCE TO RELATED APPLICATION

This application is a continuation of copending U.S. patent application Ser. No. 12/465,875, filed May 14, 2009, the entire content and disclosure of which is hereby incorporated herein by reference.

BACKGROUND OF THE INVENTION

1. Field of the Invention

The present invention generally relates to a system and method for improving the delivery of computer-based services, and more specifically, for altering the process by which the services are delivered responsive, for example, to the conditions of service. Even more specifically, the preferred embodiment of the invention relates to such systems and method that are particularly well suited for delivering such processes to mobile computing devices.

2. Background Art

Mobile computing is the practice of computing while mobile. Today, mobile handheld computing is ubiquitous. Many cell phones have more processing power and memory than the mainframe computers of the 1950s. Mobile computers are being adopted as line-of-business tools in many industries, insurance among them. When mobile computers are used this way, it is imperative that they be managed, usually in real time.

Tools for real-time management of mobile computers are available from many companies, among them Nokia, Motorola, Hewlett-Packard, MFormation and Research In Motion. These device management tools are used as part of management processes. For example, if a mobile computer is lost or stolen, this initiates a management process designed to reduce the risk of loss of information held in the device. Service providers like the International Business Machines Corporation (IBM) provide mobile computer management as a service.

Because of the highly variable environment that mobile computing operates in, certain service processes may need to be altered ("expedited") on the fly. An example is based on property and casualty insurance catastrophic claims. Whereas normal claims processing may require pre-approval for claims payment, under circumstances of catastrophe it may be desirable to pay a claim first and then post-audit the claim, especially if failure to pay a claim in a timely manner might lead to increased payouts.

Service processes today are often performed manually. A call is received from the user of a mobile device, and the call center operator uses a device management tool to change the configuration of the mobile device so as to respond to the user's concerns. The call center operator follows a pre-designed process. Opportunities for streamlining the process may not be apparent; the operator may be precluded from changing the process in any way by policy restrictions. But since operators are capable of judging the suitability of a given process to satisfy the user's concerns, and can also judge the need for each step in the process, the human user can, on occasion, modify the way the process is executed so as to simplify or streamline the process execution.

Some mobile device management is being performed using automated service managers, where the service manager executes a computer-readable process definition and uses it to control device management tools.

When computer-readable process definitions exist, today's approach is to encode all possible known variability in the service process definition, or to allow substitution of alternate implementations of a process step based on contextual information. In the former situation, the process description becomes overly complex, while in the latter situation, only changes to step implementations can be done. With the introduction of automation via computer-readable process definitions, some desirable flexibility is lost.

SUMMARY OF THE INVENTION

An object of the present invention is to simplify the design of service processes, while also making these service processes more flexible.

Another object of this invention is to transform process definitions based on the context of their execution and the results of earlier process steps so as to expedite or streamline the service process.

A further object of the invention is to improve process execution efficiency, reducing the time necessary to complete the process and reducing the resources that the process consumes.

Another object of the invention is to apply program-rewriting techniques to process definitions, such that an assertion of assumptions will cause the process definition to be rewritten for expedited execution.

These and other objectives are attained with a method, system, and article of manufacture for transforming a definition of a process for delivering a service. This definition is comprised of computer readable code in a computer readable form that is operated on a computing device. For example, this code may be transmitted from a server computer to a client device for operation on the client device. Alternatively, the definition of the process may be executed at a remote server. The method comprises the steps of expressing a given set of assumptions in a computer readable code; and transforming said definition by using a processing unit to apply said given set of assumptions in the computer readable code to said definition to change the configuration of the process.

In embodiments of the invention, the computing device is or is used with a client device that operates in a specified context, and the step of transforming the definition includes the steps of defining a set of factors relating to the specific context in which the client device operates, expressing said factors in a computer readable code, and applying said factors in the computer readable code to the definition to change the definition. Also, the step of transforming the definition of the process may be done by creating a flow diagram for the service process definition, locating a flow in the flow diagram and to which the assumptions apply, and applying one or more of a defined set of program rewriting techniques at the located flow to transform the service process. These steps of locating a flow in the flow diagram and applying the program rewriting techniques at those flows are repeated until there are no more flows in the diagram to which any of the assumptions apply.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
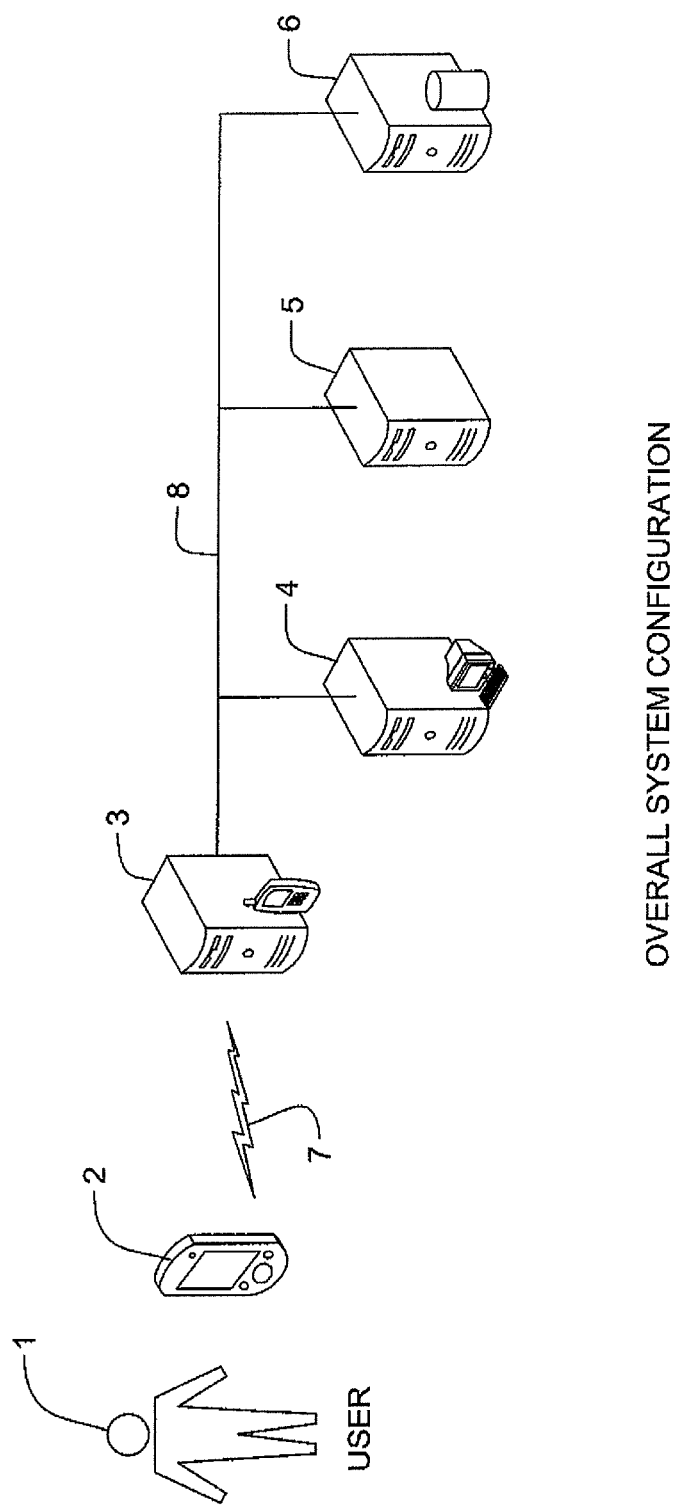
FIG. 1 illustrates the overall configuration of a mobile computing system in which the invention may be practiced.

A preferred embodiment of the invention will now be described. FIG. 1 shows the overall configuration of a mobile computing system in which the invention may be practiced. Human user 1 interacts with Personal Digital Assistant (PDA) 2 in the normal practice of his or her profession. PDA 2 communicates with Mobile Gateway server 3 via wireless and wired networks 7. Mobile Gateway server 3 serves to transform data formats and protocols used on network 7 to and from those used on network 8, and additionally provides security services such as a firewall, encryption/decryption and user authentication. Network 8 connects the components of the fixed infrastructure of the mobile computing system shown in FIG. 1.

Servers 4, 5 and 6 are shown in FIG. 1 connected to network 8, which provides a common communications network among the servers 3-6. Management server 4 contains software capable of inspecting and altering the software and settings of PDA 2. Database server 6 contains data management software and attached storage for software installation files, logs and process definitions. Application server 5 contains software capable of executing process definitions. In operation, an executing process definition in application server 5 retrieves and stores data in database server 6 and controls management server 4 so as to manage the configuration (software and settings) of PDA 2. It is to be appreciated that actual configurations of the system shown in FIG. 1 may have many thousands of PDAs and other mobile computing devices active simultaneously.

Figure 2:
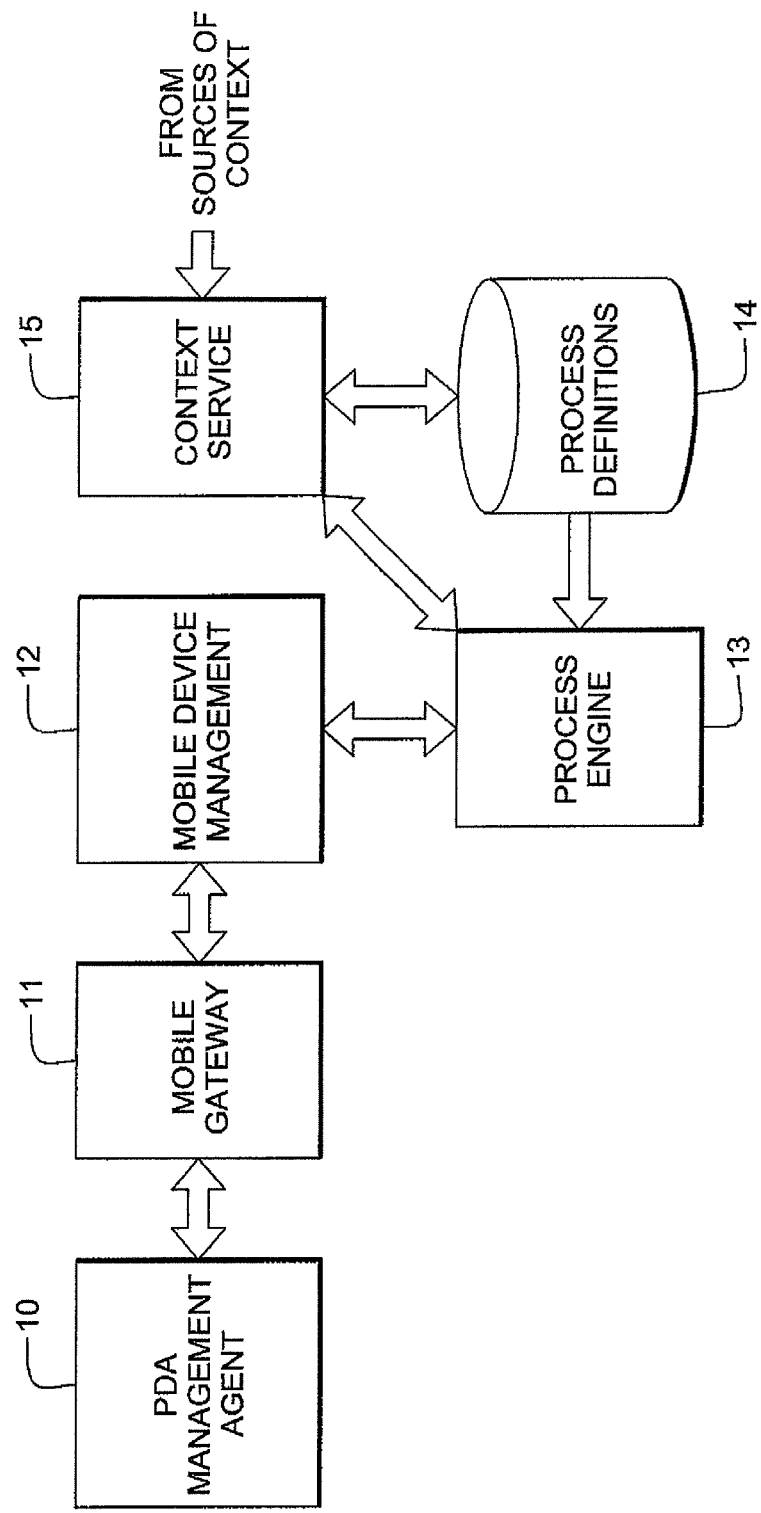
FIG. 2 illustrates the major software components of the system.

FIG. 2 shows the major software components of the system. Block 10 represents the agent software that can inspect and change the configuration of the PDA under the control of block 12, the Mobile Device Management block. Block 11, the Mobile Gateway, has been previously described and fulfills the functions of protocol transformation, firewall, encryption/decryption and user and device authentication. Process Engine 13 controls Mobile Device Management 12 using software interfaces exposed by Mobile Device Management 12. Process definitions are stored on storage device 14. Context Service 15 inspects context information from sources (not shown) and supports context-dependent alteration of process definitions residing on storage block 14. Note that block 15, Context Service, also communicates directly with the Process Engine, block 13. This permits modification of processes that are in execution.

Figure 3:
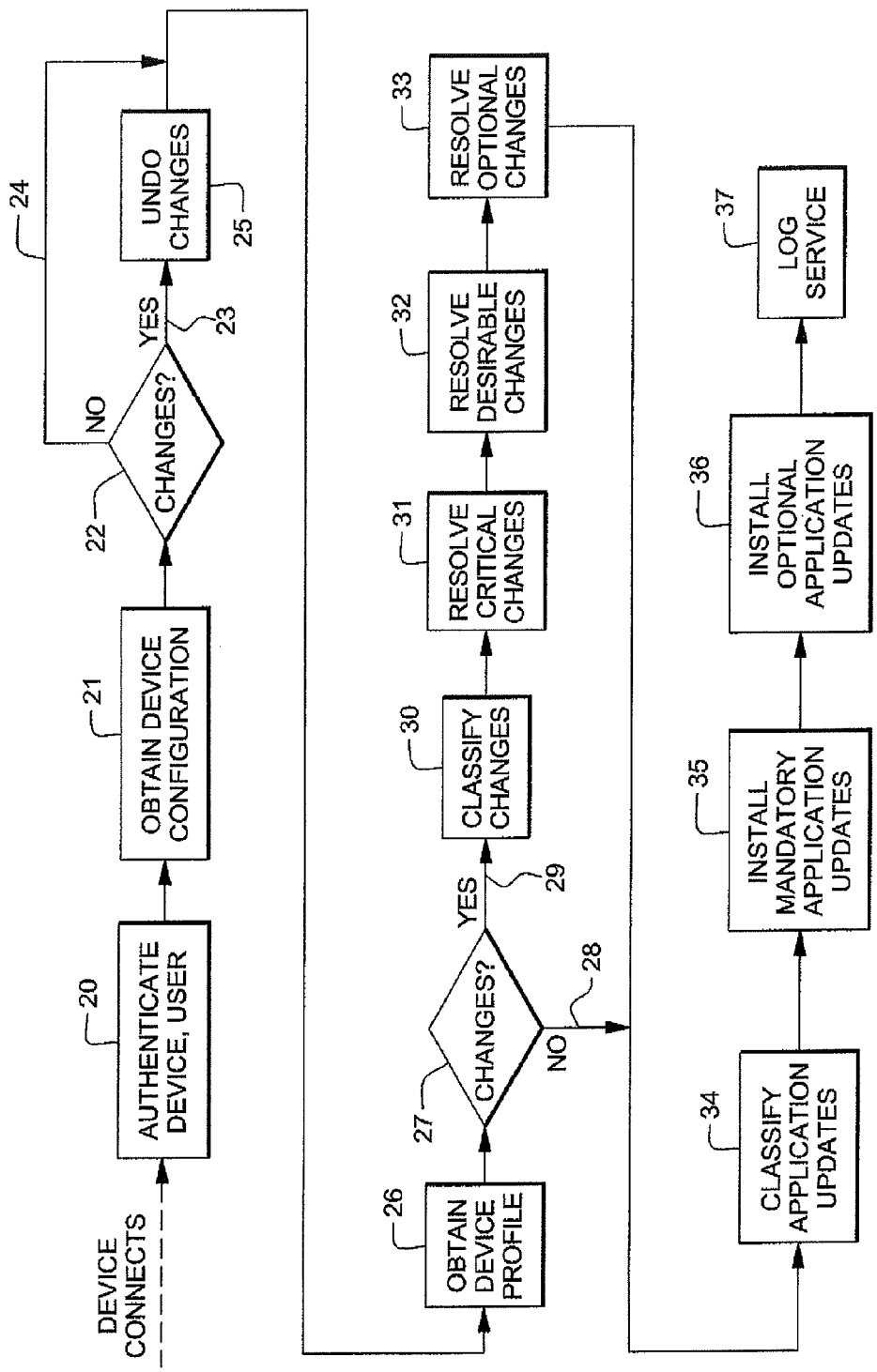
FIG. 3 illustrates a normal application software update process.

FIG. 3 shows a flowchart of an application software installation process, appropriate to normal service delivery. This process begins in block 20 when a mobile device connects to the system. Block 20 authenticates the device and its user. If the authentication fails, via a path not shown, no service will be given. Block 21 then downloads the current configuration of the device, including all installed software and operating system and hardware settings. Decision block 22 then checks to see if any configuration changes have been made. If so, branch 23 is taken to block 25, which reverses the changes. If not, branch 24 is taken. In either case, processing continues with block 26, which then accesses the desired configuration profile for the device. Decision block 27 determines if any changes have been made to this profile. If not, branch 28 is taken to block 34. If so, branch 29 is taken to block 30

Block 30 classifies profile changes into critical, desirable and optional changes. Block 31 resolves the critical changes, block 32 resolves the desirable changes and block 33 resolves the optional changes, whereupon block 34 is entered.

Block 34 classifies the application software updates as mandatory or optional. Block 35 then installs the mandatory updates, followed by block 36, which installs the optional updates. The software update installation process then concludes with block 37, which records what service has been performed.

Figure 4:
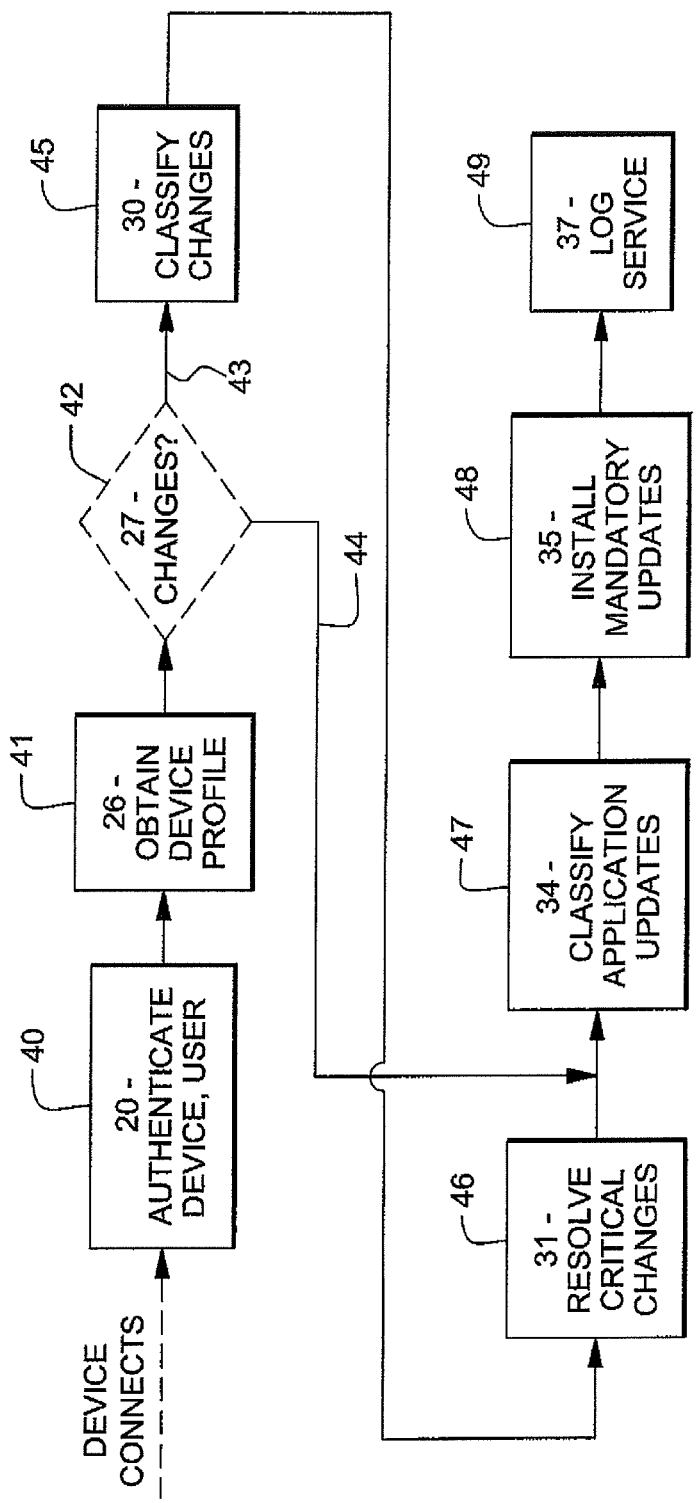
FIG. 4 illustrates an expedited application software update process.

In contrast with FIG. 3, FIG. 4 shows an expedited application software update process, appropriate in circumstances where time, wireless network bandwidth and mobile device power reserves are limited. This process assumes somewhat greater risk that the configuration of the mobile device may not be exactly as called for in its profile, in that the process of FIG. 4 would not perform updates that would have been performed immediately by the process of FIG. 3. The legends of the blocks of FIG. 4 include block numbers from FIG. 3 to show that this preferred expedited process is a strict subset of the normal process.

The expedited application software update process of FIG. 4 begins with the connection of the mobile device, activating block 40, which authenticates the device and its user. Block 41 obtains the device profile and block 42 determines whether there have been any changes. If there are none, branch 44 is taken to block 47. If there have been changes, branch 43 is taken to block 45, which classifies the changes, followed by block 46 which resolves critical changes. The operation of blocks 41, 42, 45 and 47 can be performed ahead of the time that the device connects. Block 47 then classifies the application software updates and block 48 installs the mandatory application software updates. Block 49 records what service has been performed.

The process of FIG. 4 is much simpler than that of FIG. 3 in part because of an assumption that the configuration of the mobile device has not changed since its last service. Some mobile device software can be configured so as to prohibit such configuration changes by the end user, thus assuring that the assumption will be valid. An alternate approach is to have the mobile device maintain a record of the configuration changes it experiences at the hands of its user. If that record is empty, the assumption holds. As long as the assumption is true, the only differences that can arise between the device configuration and its profile come about because of changes in the device profile, which can be determined and classified ahead of the time that the device connects.

A second assumption is embodied in FIG. 4: that only the most critical operations should be performed, with the rest deferred to a time at which more resources are available and when the availability of the device itself is less critical. This assumption can be used to triage the list of differences to only the most critical. Thus, in FIG. 3, all differences are resolved, while in FIG. 4 only critical differences are resolved. Similarly, this second assumption can be used to eliminate block 36 of FIG. 3 because only mandatory updates will be installed.

The process could be designed (and rewritten) to explicitly test these two assumptions with decision blocks. This may not be preferred because it complicates the process design. In turn, this means more time and effort to design the process, more implementation cost and time, greater testing complexity and time and, most importantly, greater difficulty of maintenance. It is desirable that the process design be no more complex than that of FIG. 3, but that the process be executed as if it were designed as in FIG. 4 when the two assumptions hold.

The invention applies program-rewriting techniques to process definitions, such that an assertion of assumptions will cause the process definition to be rewritten for expedited execution. The discussion below explains how process definitions can be rewritten in a practical style, recognizing that more detail can be obtained from papers in such publications as the "Proceedings of the 11$^{th}$ International Conference on Rewriting Techniques and Applications (RTA 2000)," July 2000, published by Springer Verlag, ISBN-10 354067778X. The discussion given herein is concerned with process definitions expressed in WS-BPEL, an XML-based language, whose standard "Web Services Business Process Execution Language Version 2.0" is available online from www.oasis-open.org. This language represents process steps, decision elements, sequential and parallel flow in a manner suitable for execution by a process execution engine such as IBM Process Server, described at http://www-306.ibm.com/software/integration/wps and in the book "WebSphere Business Integration Primer: Process Server, BPEL, SCA and SOA" in the developerWorks series, Iyengar et. al., IBM Press, December 2007, ISBN-10 013224831X.

Important properties of program rewriting that are used in the preferred embodiment of the present invention concern the behavior of program elements that produce outputs or consume inputs. One property is that if a program element produces no outputs, it can be eliminated. Another is that if the outputs of a program element are the same as its inputs, the program element can be eliminated. A third property concerns program elements that produce output or perform other processing actions dependent on inputs, and specifically the case of program elements comprised of program loops whose body is executed once for each input element. In the case of such loops, it can be easily seen that if no input is present, the loop body will not be executed. If output or other processing actions originates solely within the loop body, no output or other processing actions will result if there are no input elements. Another property of program rewriting that may be used is the property that allows elimination of blocks on a branch from a decision block, where the decision can be predetermined and the blocks are on a branch which is known not to be taken.

The discussion below indicates, generally, how these properties, together with the two assumptions, can be used in the transformation of the application software update process of FIG. 3 under the given assumptions. Restating the assumptions here for convenience, they are:
1. There has been no change to the device configuration.
2. Only critical or mandatory updates are to be performed.

Beginning with block 20 of FIG. 3, we find that this block is independent of the assumptions, as are blocks 21 and 26. By assumption, however, the decision of block 22 is false, there being no changes in the device configuration. This allows us to eliminate block 25 and, in turn, to eliminate block 21 since the input to block 22 is no longer required. Blocks 26 and 27 are both required, but we have observed that these blocks can be performed prior to the time at which the device connects. Block 30 is still required, but can be performed prior to the time at which the device connects. Note that the output of block 30 is a list of critical differences. Blocks 32 and 33 can now be eliminated because their inputs are empty. Only block 31 remains. Continuing in the process flow, block 34 is necessary but can be performed prior to the time at which the device connects. The output of block 34 is comprised of two lists, a list of mandatory application updates, and a list of optional application updates. By assumption, the list of optional application updates is empty, so block 36 can be eliminated because its input is empty. It is seen that the remaining blocks are exactly those of FIG. 4.

Figure 5:
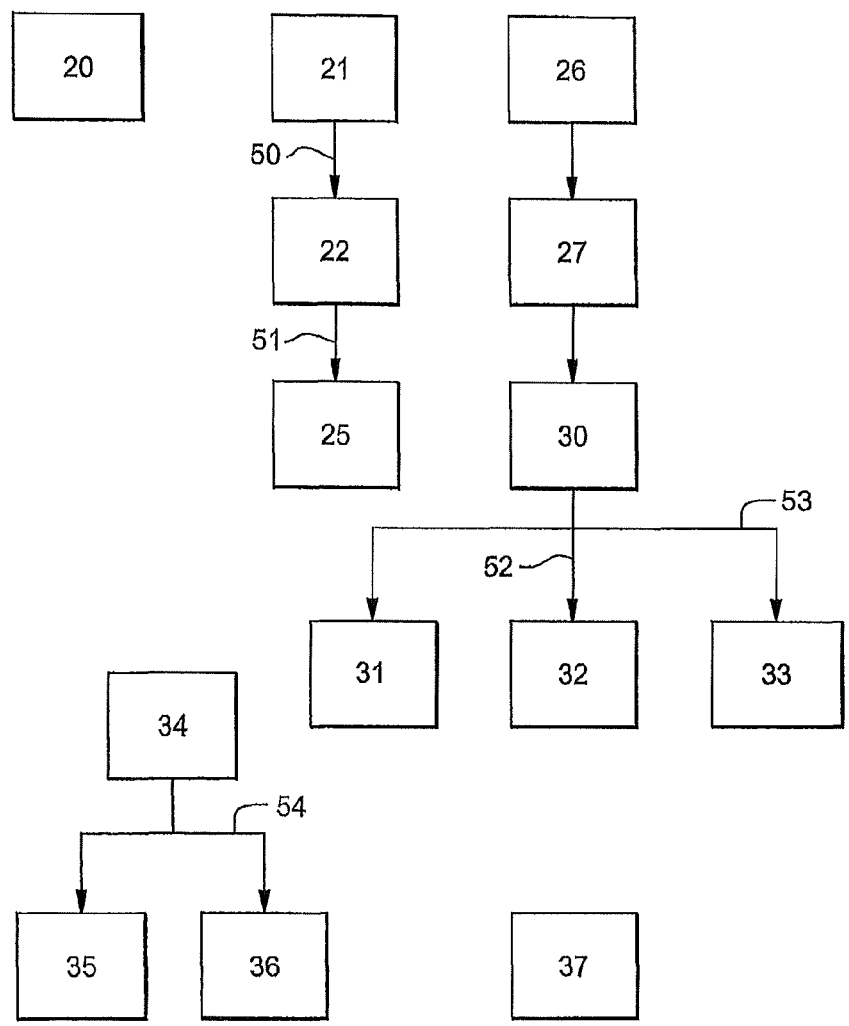
FIG. 5 illustrates a data flow diagram of the process of FIG. 3.

It remains to be shown how the general description of the process transformation given above can be reduced to an automatic process. This is facilitated by the data flow diagram of FIG. 5. This diagram shows the flow of data among the various components of FIG. 3. Each box in FIG. 5 is numbered according to the blocks of FIG. 3. For example, flow 50 of FIG. 5 represents the output of block 21 of FIG. 3, a device configuration, and shows that this output flows from block 21 of FIG. 3 to block 22 of FIG. 3. This diagram is very useful because it complements the diagram of FIG. 3, which shows the sequencing of tasks in a process, not the flow of data from one task to another. Thus there is a branch between blocks 25 and 26 of FIG. 3, but no data is produced by block 25.

Note that the two assumptions given earlier can be applied to the data flow diagram of FIG. 5. In particular, the assertion that the device configuration has not changed implies that the decision block 22 outcome is false. This allows elimination of block 22 and block 25, since the latter block is on a path 51 not taken. Since block 21 exists to produce data that is input to block 22, and that block has been eliminated, block 21 can be eliminated as well. Blocks 26, 27 and 30 are required but blocks 32 and 33 can be eliminated by assumption (flows 52 and 53 are empty). Block 34 is required but block 36 can also be eliminated by assumption (flow 54 is empty). We are left with blocks 20, 26, 27, 30, 31, 34, 35 and 37 as shown in FIG. 4.

Now we can state a preferred algorithmic process for the automatic transformation of processes, given assumptions concerning these processes:
1. Create a data flow diagram for the process.
2. Locate flows in the diagram to which the assumptions apply.
3. Using the above-discussed properties of program rewriting, eliminate any blocks whose input is the same as their output, or whose output is not required, or which have output dependent on their inputs and have no inputs. Also eliminate blocks on paths from decision blocks that are known by assumption not to be taken.
4. Repeat step 3 until there are no blocks remaining that can be eliminated by the three properties.

Figure 6:
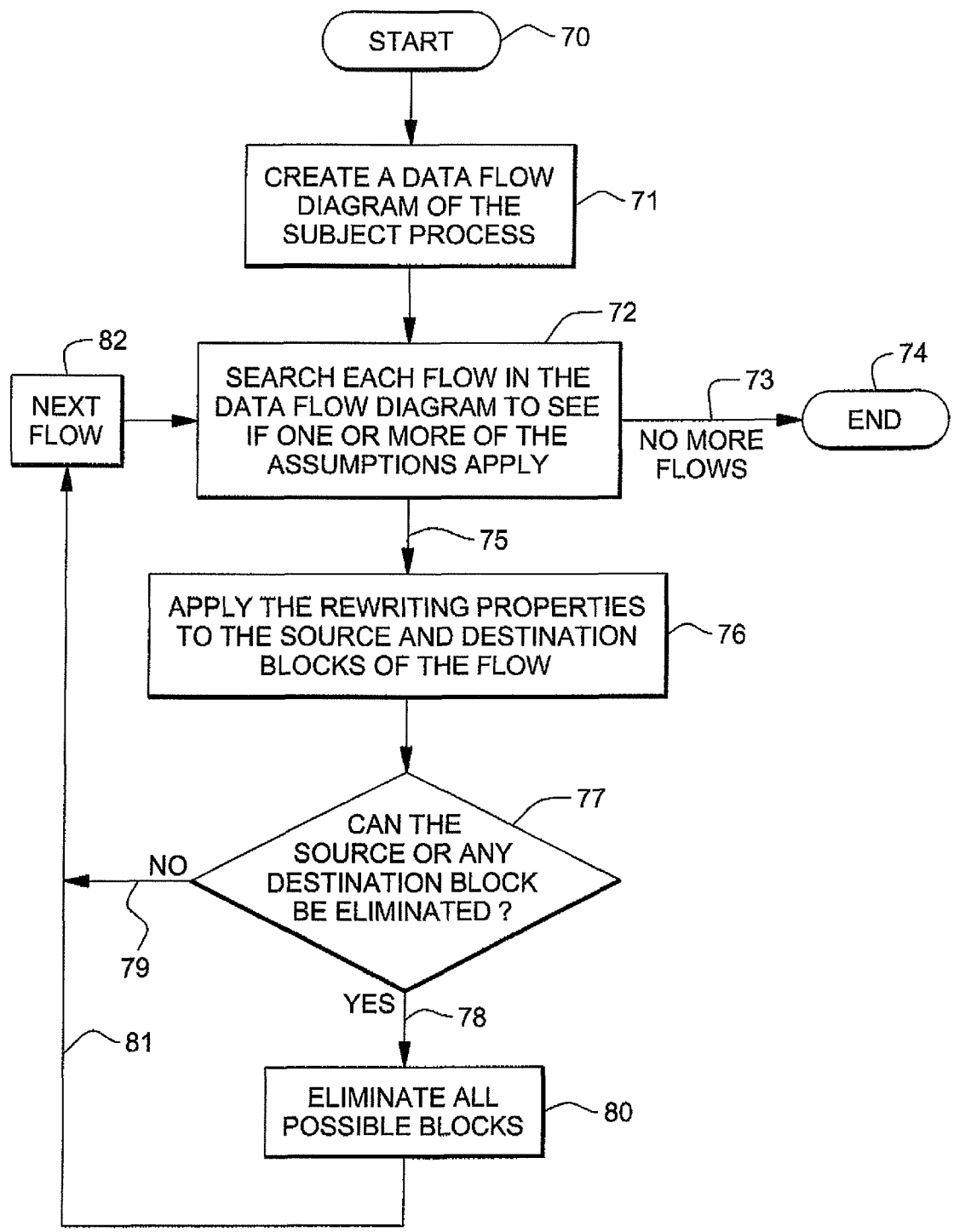
FIG. 6 gives a flow chart of a process by which processes may be transformed into simpler processes in an automatic manner.

A generic flow chart implementing this algorithm is shown in FIG. 6. The process starts in block 70. In block 71, a data flow diagram of the subject process is prepared. This diagram can be created manually or automatically through analysis of the WS-BPEL representation of the process. In block 72, a flow in the data flow diagram is identified and checked against all of the current assumptions. If no more such flows exist, branch 73 is taken to terminate the transformation process at 74. If at least one flow exists, branch 75 is taken to block 76, where all of the rewriting rules are applied to the source and destination blocks of the flow. In decision block 77, it is determined whether any blocks can be eliminated. If so, branch 78 is taken to block 80, which eliminates all possible blocks from the subject process. The transformation process then continues via branch 81 to block 82, which chooses the next flow for testing. If no blocks can be eliminated, branch 79 is taken to block 82 to continue the transformation.

The creation of the data flow diagram, at block 71, in FIG. 6, is straightforward and should be familiar to those skilled in the art of process design and analysis. This process is especially simplified in the case of process representations such as WS-BPEL, where the source and destination of data produced from and consumed by process elements is explicitly represented. Also, WS-BPEL representations are not alterable at run-time, so the complexities of a dynamically modified process are not present. Note that even if the data flow diagram is prepared manually, it need only be done once.

Many forms of this invention are possible. Transformations can be done at the time the process is begun or at some previous time in anticipation of the assumptions that will apply. The transformed process can be immediately deployed or it can be displayed to a human administrator for approval before it is deployed. When maintenance actions are performed on the normal process definition, all of the stored transformations may preferably be redone so that a consistent definition of the process is deployed. The transformation invention can be practiced with software tools that are leased or purchased; alternatively, a second party can provide a service. For example, the service may accept process definitions and assumptions and may return expedited process definitions for a one-time fee, for a charge based on the actual resources employed for the transformation or on a retainer basis. Process definitions are not limited to maintenance actions on mobile devices, but may be of any type and in any industry.

Figure 7:
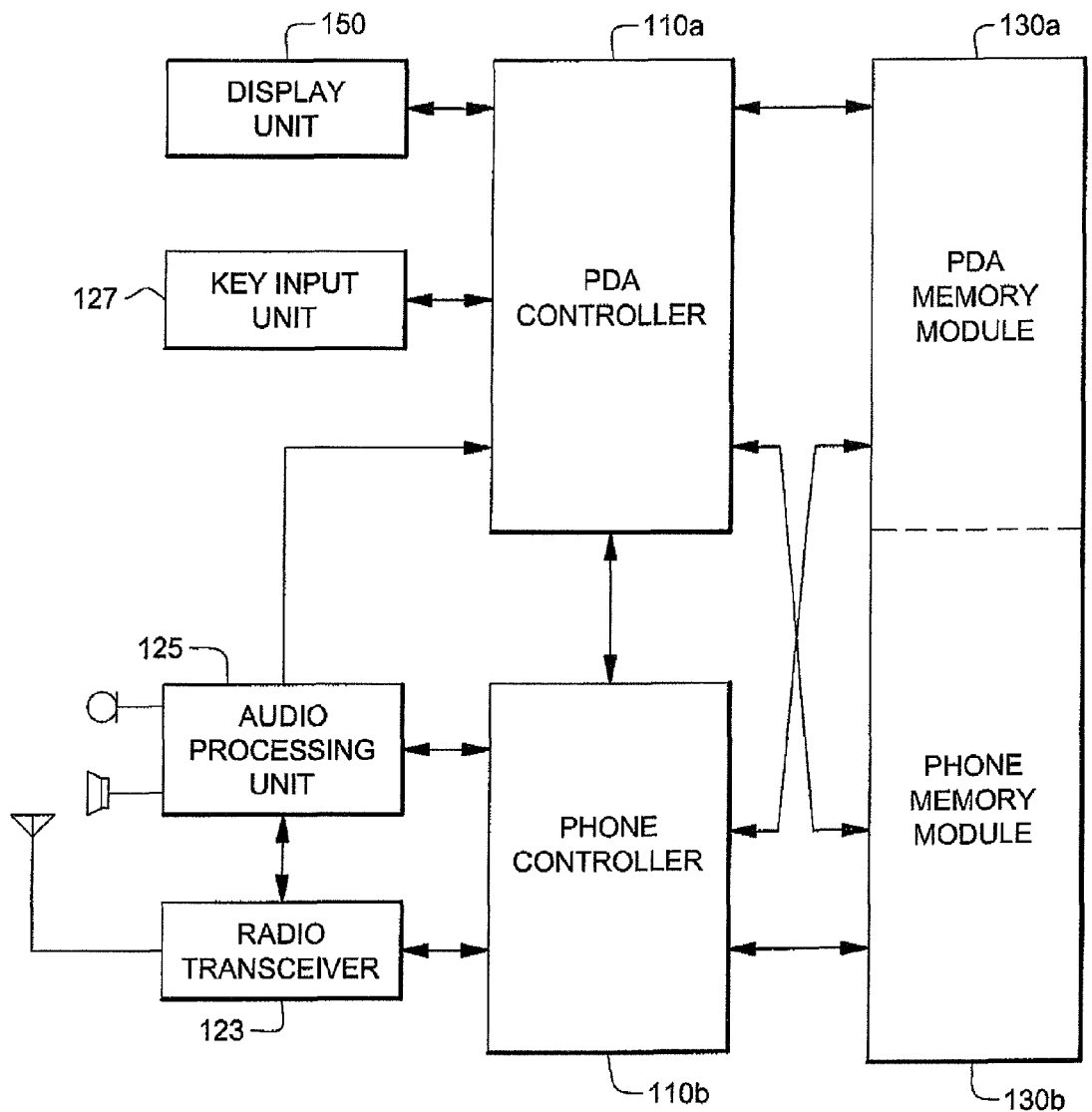
FIG. 7 is an exemplary diagram of a client device that may be used in the system of FIG. 1.

FIG. 7 is a block diagram illustrating a Personal Digital Assistant (PDA) phone that may be used in the system of FIG. 1. Referring to FIG. 7, a key input unit 127 includes keys to input number and character information and function keys to set various functions. The key input unit 127 receives key input data of a user and transmits the key input data to a PDA controller 110a.

A radio transceiver 123 performs a wireless communication function of the PDA phone and includes a Radio Frequency (RF) module (not shown) and a modem (not shown). The RF module includes an RF transmitter (not shown) for up-converting a frequency of a signal to be transmitted and for amplifying the frequency up-converted signal. The RF module also includes an RF receiver (not shown) for low noise amplifying a received signal and down-converting a frequency of the low noise amplified signal. The modem includes a transmitter (not shown) for encoding and modulating a signal to be transmitted and a receiver (not shown) for demodulating and decoding a signal received from the RF module.

An audio processing unit 125 can include a codec including a data codec and an audio codec. The data codec processes packet data, and the audio codec processes an audio signal such as voice and a multimedia file. The audio processing unit 125 converts a digital audio signal received from the modem to an analog audio signal using the audio codec and reproduces the analog audio signal. The audio processing unit 125 may also convert an analog audio signal generated by a microphone to a digital audio signal and transmit the digital audio signal to the modem. The codec may exist separately or be included in the PDA controller 110a or a phone controller 110b.

A PDA memory module 130a and a phone memory module 130b can be comprised of Read Only Memory (ROM) or Random Access Memory (RAM). The PDA memory module 130a and the phone memory module 130b can be comprised of a program memory and a data memory and store programs for controlling an operation of the PDA phone and data for booting. The PDA memory module 130a and the phone memory module 130b can be configured in a single memory or separately.

A display unit 150 displays an image corresponding to an image signal and user data output from the PDA controller 110a on a screen. The display unit 150 also displays data related to a phone call, which is output from the phone controller 110b. The display unit 150 can be made up of a Liquid Crystal Display (LCD) or Organic Light Emitting Diodes (OLED). If the LCD or OLED is implemented using a touch screen, the display unit 50 may operate as an input unit for controlling the PDA phone together with the key-input unit 127.

Those of ordinary skill in the art will appreciate that the hardware in FIG. 7 may vary depending on the implementation. Other internal hardware or peripheral devices, such as flash read-only memory (ROM), equivalent nonvolatile memory, or optical disk drives and the like, may be used in addition to or in place of the hardware depicted in FIG. 7.

The depicted example in FIG. 7 and above-described examples are not meant to imply architectural limitations. For example, the present invention may be practiced with a notebook computer or hand held computer in addition to a PDA, or indeed with a computer of any type.

Figure 8:
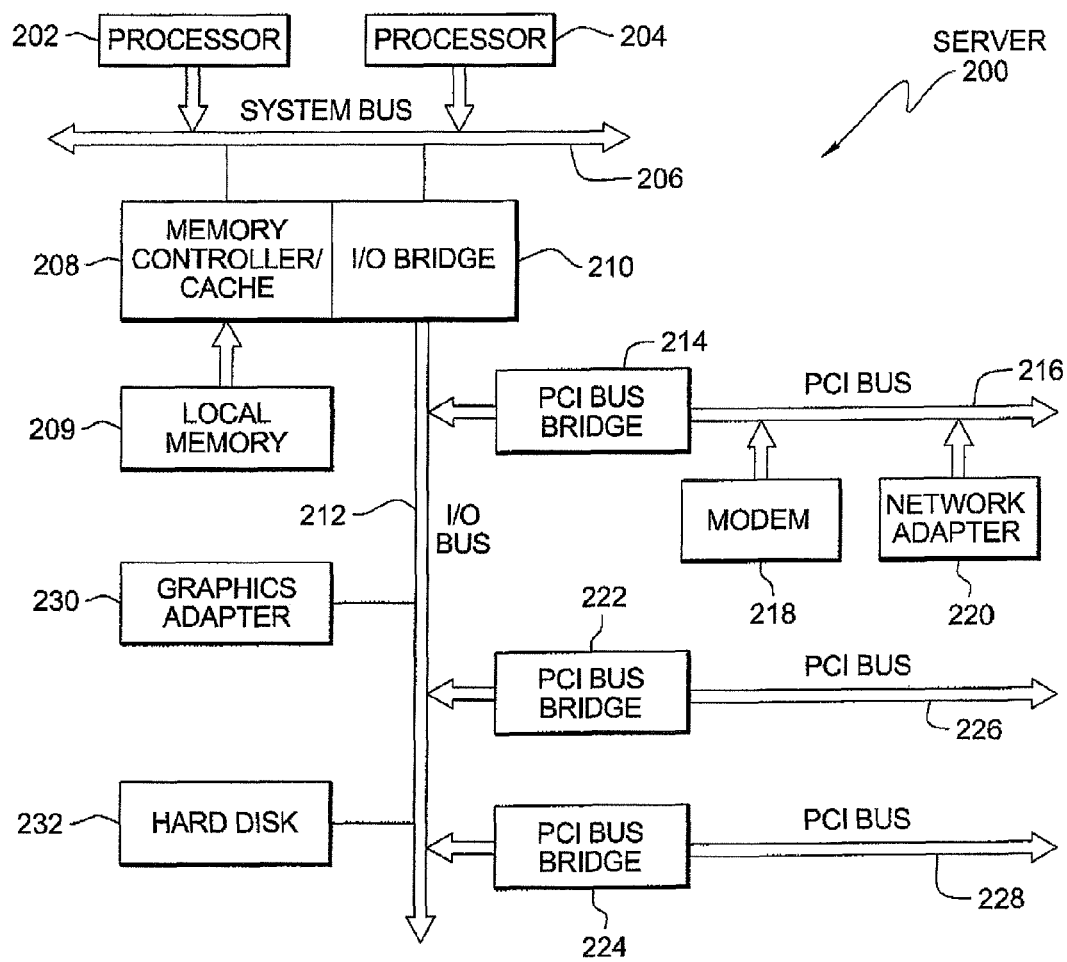
FIG. 8 is an exemplary diagram of a server computer device that may be used as a server in the system of FIG. 1.

Referring to FIG. 8, a block diagram of a data processing system that may be implemented as a server, such as server 4 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 8 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 8 may be, for example, an IBM eServer pSeries system, a product of International Business Machines Corporation in Armonk, N.Y., running the Advanced Interactive Executive (AIX) operating system or LINUX operating system.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of transforming a definition of a process for delivering a service on a specified mobile client device, said definition including a multitude of components and being comprised of first computer readable code in a computer readable form, the method comprising the steps of:
   expressing in a second computer readable code a given set of assumptions for executing the definitions of the process on the specified mobile client device; and
   identifying a data flow in the definition of the process;
   applying said given set of assumptions to said data flow to identify one or more of said components of said definition of the process for removal from said definition;
   transforming said definition of the process by removing said identified one or more of said components from said definition to obtain a changed definition of the process; and
   executing the changed definition of the process on the specified mobile client device therefrom; wherein
   the step of identifying a data flow includes the steps of:
   creating a flow diagram for the process;
   locating flows in the flow diagram to which the assumptions apply, and including the steps:
   locating one of the flows in the flow diagram to which one or more of the assumptions apply; and
   repeating the step of locating one of the flows in the flow diagram until there are no more flows in the flow diagram to which any of the assumptions apply.

2. The method according to claim 1, wherein the specified mobile client device operates in a specified context and the step of transforming said definition includes the steps of:
   defining a set of factors relating to said context, and expressing said factors in a third computer readable code; and
   applying said factors in the third computer readable code to the definition of the process to change the definition of the process.

3. The method according to claim 1, wherein the step of transforming said definition includes the step of applying a defined set of program rewriting techniques to the definition at the located flows to transform the definition.

4. The method according to claim 1, wherein said assumptions include: there has been no change to a configuration of the specified mobile client device since a defined time.

5. The method according to claim 4, wherein the assumptions further include: only defined types of updates are to be performed on the specified mobile client device.

6. The method according to claim 3, wherein the process includes a plurality of program elements, and wherein:
   the defined set of program rewriting techniques include: if one of the program elements produces no outputs, then eliminating said one of the program elements.

7. The method according to claim 6, wherein the defined set of program rewriting techniques further includes: if the output of one of the program elements is the same as the input to said one of the program elements, eliminating said one of the program elements.

8. A method of transforming a definition of a process for delivering a service on a specified mobile client device, said definition including a multitude of components and being comprised of first computer readable code in a computer readable form, the method comprising the steps of:
   expressing in a second computer readable code a given set of assumptions for executing the definitions of the process on the specified mobile client device; and
   using said given set of assumptions to identify one or more of said components of said definition of the process for removal from said definition;
   transforming said definition of the process by removing said identified one or more of said components from said definition to obtain a changed the operation of the process; and
   executing the changed definition of the process on the specified mobile client device therefrom;
   and wherein:
   the step of transforming said definition includes the steps of:
   creating a flow diagram for the process;
   locating flows in the flow diagram to which the assumptions apply; and
   applying a defined set of program rewriting techniques to the definition at the located flows to transform the definition;
   the process includes a plurality of program elements; and
   the defined set of program rewriting techniques further include:
   if one of the program elements has an output dependent on the input to said one of the program elements and said one of the program elements has no input, then eliminating said one of the program elements; and
   if an assumption determines the outcome of a decision then all blocks on the path not taken can be eliminated.

9. A method of optimizing mobile services offered by a mobile client computer device, the method comprising the steps of:
   storing a definition of a process for delivering a service from the mobile client computer device, said definition including a multitude of components and being in computer readable code in a data storage device;
   transmitting said definition of the process to the mobile client computer device using one or more server computers;
   expressing in a computer readable code a given set of assumptions for executing the definition of the process on the specified mobile client computer device;
   identifying a data flow in the definition of the process;

applying said given set of assumptions to said data flow to identify one or more of said components of said definition of the process for removal from said definition;

after the step of transmitting the definition to the mobile client computer device, transforming said definition of the process by removing said identified one or more of said components from said definition to obtain a changed definition of the process; and executing the changed definition of the process on the specified mobile client computer device to deliver the service therefrom; and wherein the step of transforming said definition includes the steps of:

creating a flow diagram for the process;

locating a flow in the flow diagram to which one or more of the assumptions apply;

applying one or more of a defined set of program rewriting techniques at the located flow in the flow diagram; and repeating the locating and applying steps until there are no more flows in the flow diagram to which any of the assumptions apply.

10. The method according to claim 9, comprising the further steps of:

operating the mobile client computer device in a specified context; and expressing a set of factors relating to said context and in computer readable code: and wherein:

the step of transforming said definition of the process includes the step of applying said factors in the computer readable code, using said one or more server computers, to the definition of the process.

* * * * *